United States Patent [19]
Deutsch

[11] Patent Number: 5,727,284
[45] Date of Patent: Mar. 17, 1998

[54] APPARATUS FOR MAKING AN OBJECT MOVABLE

[76] Inventor: Norman Deutsch, 3 Concord Dr., Monsey, N.Y. 10952

[21] Appl. No.: 746,396

[22] Filed: Nov. 8, 1996

Related U.S. Application Data

[63] Continuation-in-part of Ser. No. 594,305, Jan. 30, 1996, abandoned.

[51] Int. Cl.[6] .................................................. B60B 33/00
[52] U.S. Cl. .............................. 16/30; 16/34; 16/18 R
[58] Field of Search .......................... 16/30, 31 A, 31 R, 16/43, 19, 18 R, 38, 32-34, 29, 343; D8/374, 375

[56] References Cited

U.S. PATENT DOCUMENTS

| | | | |
|---|---|---|---|
| 790,733 | 5/1905 | Linn et al. | 16/30 |
| 1,171,569 | 2/1916 | Wanda | 16/30 |
| 1,456,886 | 5/1923 | Gober | 16/343 |
| 2,049,344 | 7/1936 | Wittke, Jr. | 16/18 R |
| 2,359,016 | 9/1944 | Wood | 16/34 |
| 2,691,793 | 10/1954 | Jacobs | 16/30 |
| 2,774,609 | 12/1956 | Winger | 16/30 |
| 3,452,380 | 7/1969 | Walter | 16/30 |
| 5,575,036 | 11/1996 | May | 16/32 |

FOREIGN PATENT DOCUMENTS

| | | | |
|---|---|---|---|
| 339189 | 12/1930 | United Kingdom | 16/30 |
| 854282 | 11/1960 | United Kingdom | 16/34 |

*Primary Examiner*—Chuck Mah
*Attorney, Agent, or Firm*—Robert D. Katz; Robert T. Maldonado

[57] ABSTRACT

An adapter is removably attached with engagement means, such as screws, to an object such as the leg of a piece of furniture, such as a table or chair. The adapter attaches to the furniture leg in such a manner that the screws do not mar the furniture, nor do they require a groove, indentation or recess on the furniture leg for attachment thereto. The adapter is configured so that the distance from the leg to the ground is less than the diameter of the wheel mounted on the adapter. The adapter is also configured so that the leg is laterally displaced from the wheel. The wheel is also swingably retractable so that the furniture can be made stationary without having to remove the adapter.

19 Claims, 8 Drawing Sheets

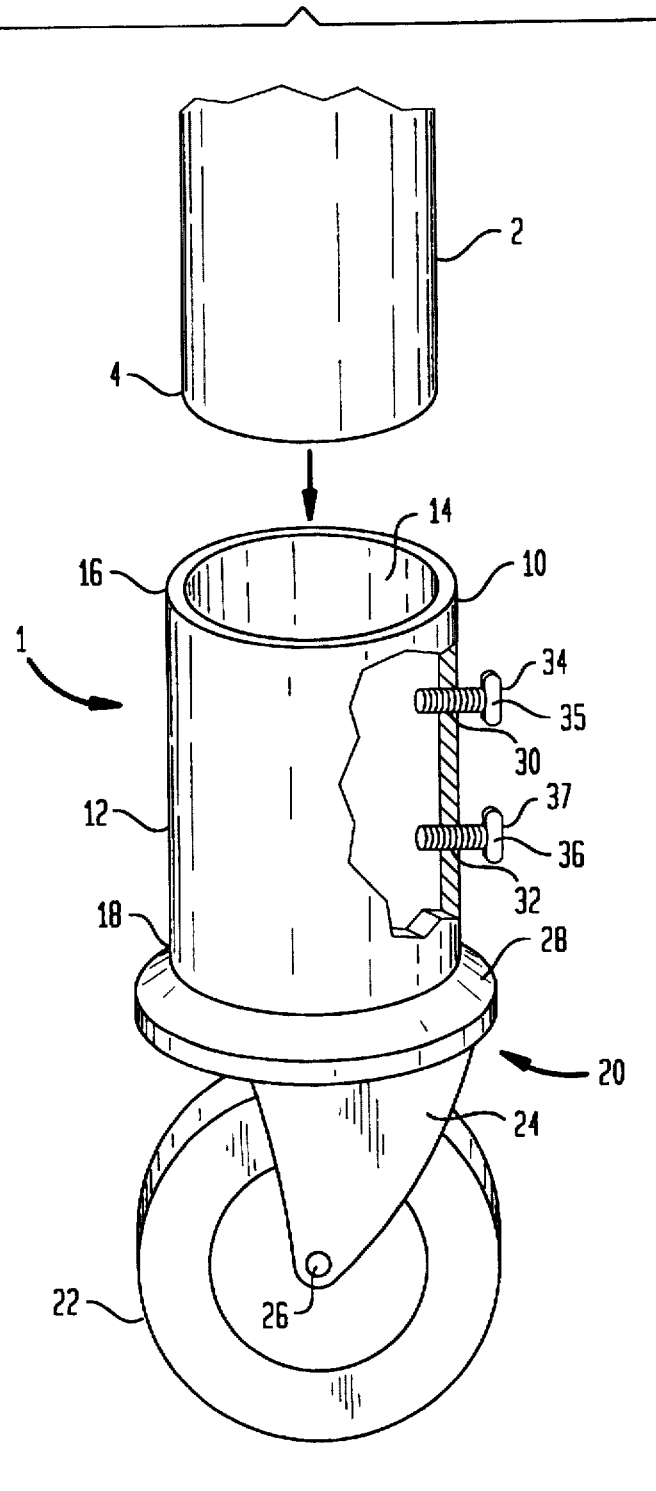

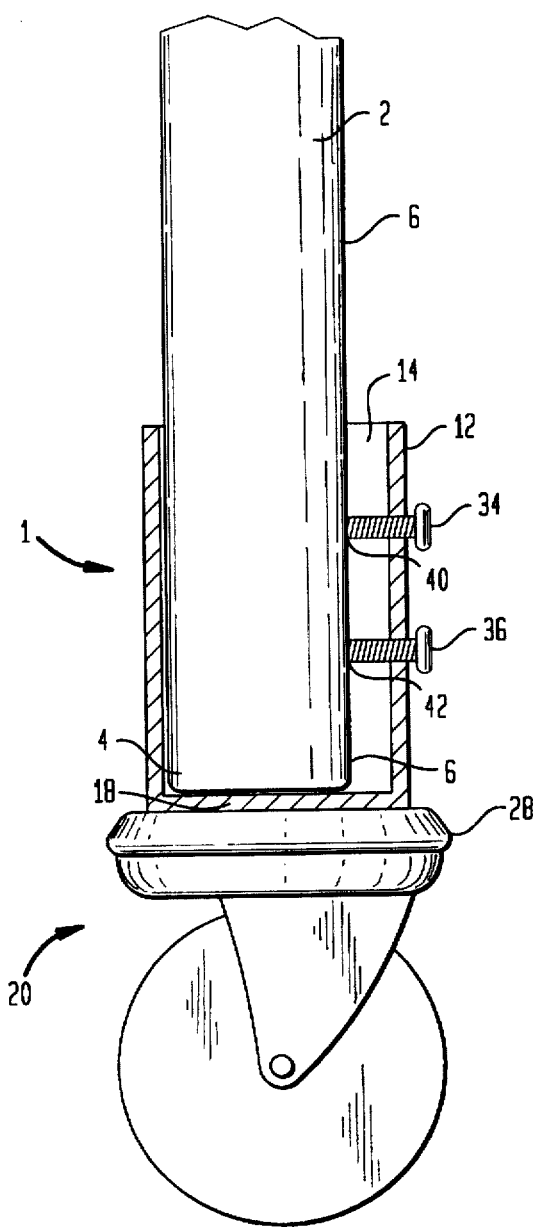
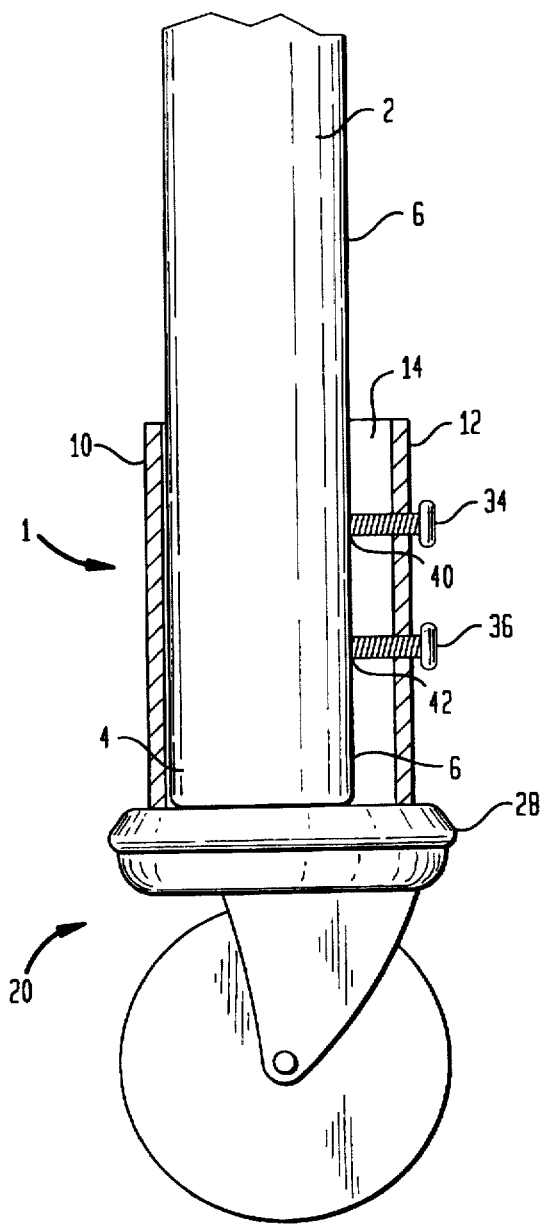
FIG. 2A
FIG. 2B

FIG. 3A
FIG. 3B
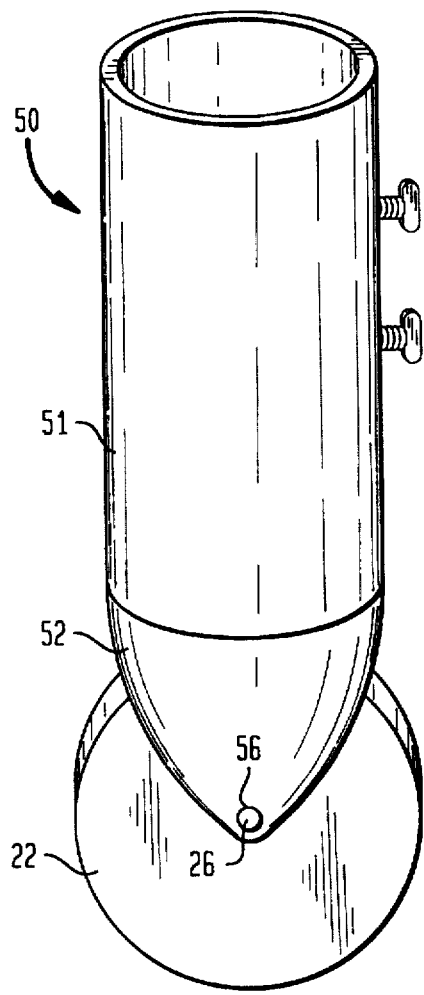
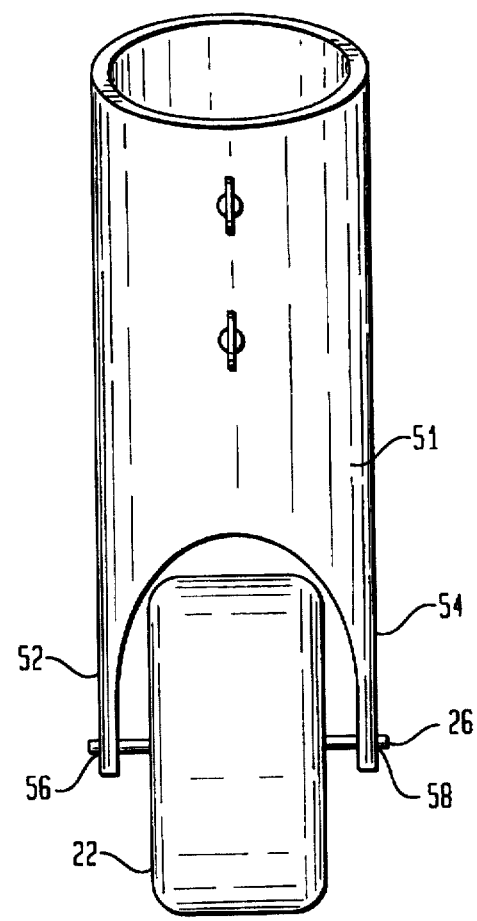

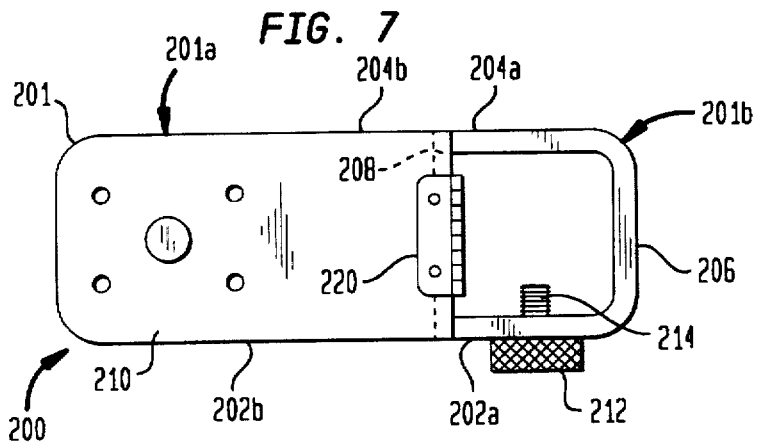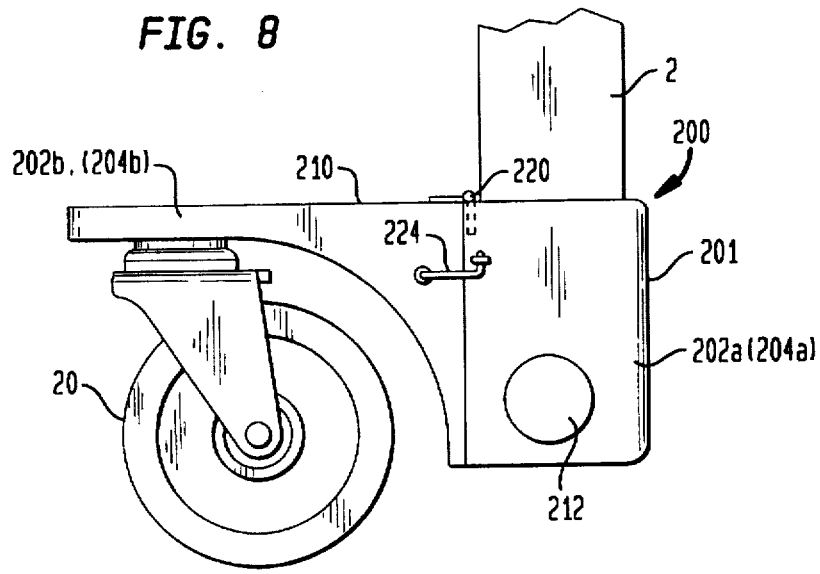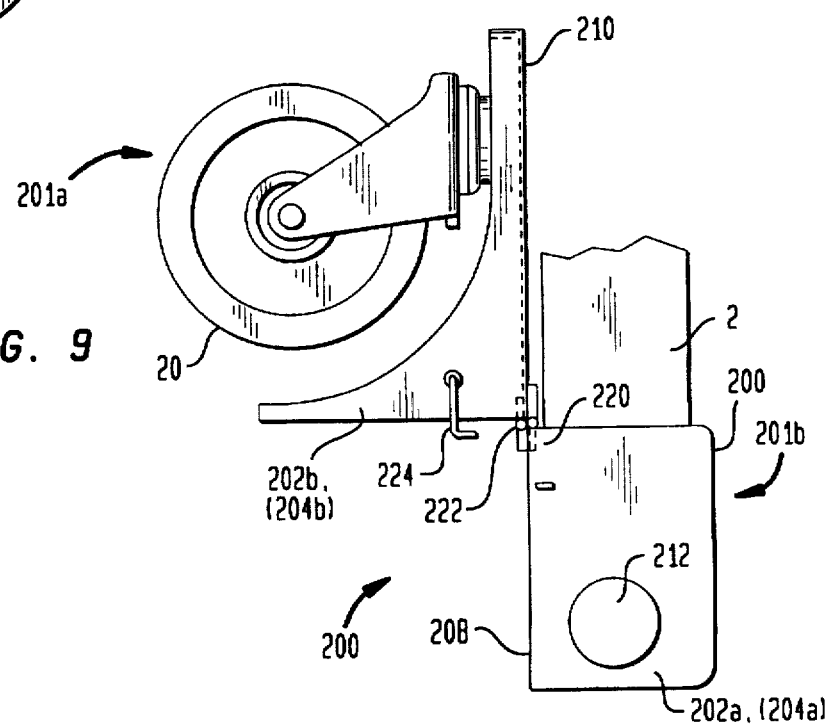

APPARATUS FOR MAKING AN OBJECT MOVABLE

This application is a continuation-in-part of U.S. patent application Ser. No. 08/594,305, filed Jan. 30, 1996 now abandoned.

BACKGROUND OF THE INVENTION

Various devices for making portable furniture, such as folding tables, movable have been proposed. These devices, usually in the form of permanently attached rollers or casters, enable the table to be moved quickly and easily from one corner of a room to another corner, for example, and are particularly useful in the catering and party rental industries, in which tables often have to be moved around quickly. Because the tables to be moved are often set with expensive and delicate china and crystal, the devices that make such tables movable must also ensure that the tables can be moved steadily and stably. Also, because of the wide variety of applications and uses to which these tables are put, the adapters must be easily attachable and detachable from the tables. Finally, because of the wide variety of tables on the market, these devices must be readily adaptable to many different kinds of tables.

The devices that have been proposed previously have been unsatisfactory because some require a hollow table leg so that the device can be inserted therein. Oftentimes, the table leg is solid or, if hollow, the end is covered with a plastic tip to prevent the table from scratching the floor. Removal of the tip is undesirable because it may have to be broken in order to remove it from the bottom of the leg. Also, the removed tips are frequently lost and, hence, the table is left with an unfinished leg that scratches floors. See, e.g., U.S. Pat. No. 3,869,105 (Daniels). Other devices are unsatisfactory because they require legs to be fitted with special features, such as grooves, slots, or pinholes, so that the adaptability of these devices to a wide variety of readily available tables is seriously reduced. See, e.g., U.S. Pat. Nos. 98,912 (Bertsche), 523,772 (Mann & Akers), and 4,969,230 (Huang). Yet other devices are undesirable because they either damage the legs of the table, see, e.g., U.S. Pat. No. 762,471 (Dori), or they are not fixed to the table leg so that they can fall off when the table is lifted or can be inadvertently slid off. Furthermore, a device that is not fixedly attached will not allow the table to move stably. See, e.g., U.S. Pat. Nos. 835,492 (Baker), 934,005 (Neuberth), 2,175,317 (Rogers), and 2,691,793 (Jacobs).

SUMMARY OF THE INVENTION

It is therefore an important or principal object of the present invention to provide an apparatus that easily and removably attaches to the legs of portable furniture, such as tables, without damaging the legs, and which is adaptable to a wide variety of tables and other furniture. It is a further object to provide a caster assembly which grips a wide variety of table legs without requiring special adapters on the leg, and which enables the legs of the table to be close to the ground. It is yet a further object to provide a caster assembly which, once attached, is retractable to make the table stationary after it has been moved to a desired location.

The foregoing objects are achieved, and the disadvantages of other devices overcome, by providing an adapter for making an object movable. The adapter includes a boot with an upwardly open interior space for receiving a portion of an object. The inserted portion of the object is disposed at the lower end of the boot, and a wheel is mounted on the upper end of the boot. This enables the bottom of the leg to be closer to the ground than if the wheel were mounted at the bottom of the leg.

Adjustable clamping means extends through a sidewall of the boot. The adjustable clamping means may be at least one screw which engages an outer surface of the inserted portion. The interior space can be cylindrical or rectangular or any other suitable shape. The outer surface of the inserted portion of the object is not fitted with any special features, such as grooves, indentations or pinholes. Thus, the adapter of the present invention provides a caster assembly which can be removably or detachably fitted to a wide variety of table legs without having first to modify the leg to fit the caster assembly. Also, the glides at the bottom of the table leg do not need to be removed to use the caster assembly.

According to another embodiment of the invention, the boot is divided into two sections which are joined by a hinge. The wheel is mounted on one section and the leg is inserted in the other section so that the section on which the wheel is mounted can be rotated with respect to the leg to disengage the wheel from the ground.

BRIEF DESCRIPTION OF THE DRAWINGS

Further objects, features and advantages of the invention will become apparent upon review of the following detailed description of the preferred embodiments, taken in conjunction with the following drawings, in which:

FIG. 1 is a front elevational view of a first embodiment of an apparatus incorporating the features of the present invention with a portion of the sleeve broken away;

FIG. 2A is a partial sectional view of the apparatus according to a first embodiment of the present invention taken along line 2—2 in FIG. 1A gripping a furniture leg;

FIG. 2B is a partial sectional view of the apparatus according to a second embodiment of the present invention taken along line 2—2 in FIG. 1A gripping a furniture leg;

FIG. 3A is a front elevational view of an apparatus according to a third embodiment of the present invention;

FIG. 3B is a side elevational view of the apparatus according to a third embodiment of the present invention;

FIG. 7 is a top view of the apparatus according to a sixth embodiment of the present invention;

FIG. 8 is a side view of the apparatus in an enabled state according to a sixth embodiment of the present invention; and FIG. 9 is a side view of the apparatus in a disabled state according to the sixth embodiment of the present invention.

DETAILED DESCRIPTION OF PREFERRED EMBODIMENTS

The different embodiments of the present invention relate to a caster assembly that is removably attached to the leg of a piece of furniture, such as a table, in order to adapt the furniture for movement without the need to modify the leg to accept the caster, and which is configured so that the caster is recessed and can be disengaged if desired.

Figure 1A:
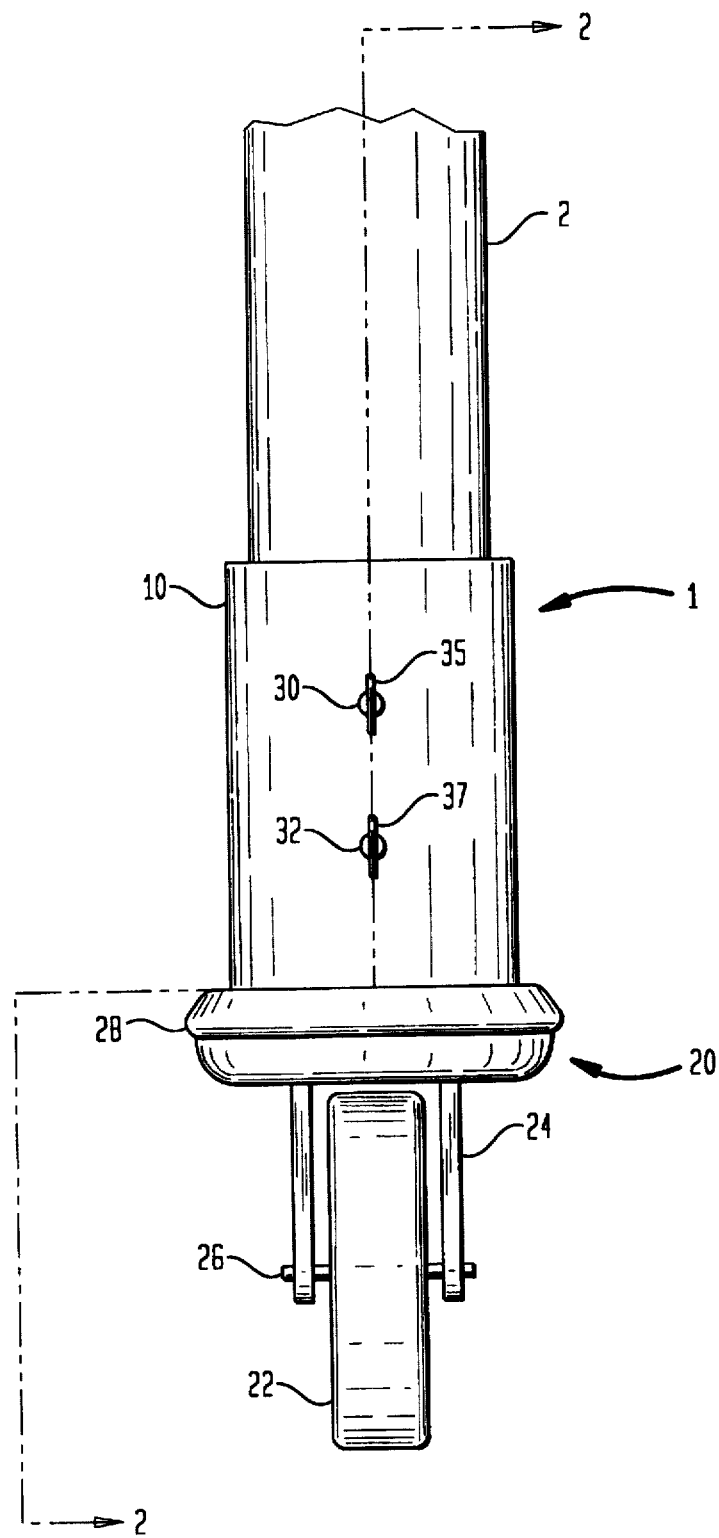
FIG. 1A is an elevational view of a side of the apparatus shown in FIG. 1.

As shown in FIG. 1, the adapter 1 includes a sleeve 10 that defines a cavity 14 for receiving a leg 2 of a piece of furniture such as a table (not shown). The leg 2 and the cavity 14 defined by the sleeve 10 have a similar preferably cylindrical shape, the diameter of the cavity 14 being larger than the diameter of the leg 2. The sleeve 10 of the adapter 1 has an open end 16 at a top thereof and a closed end 18 at a bottom thereof opposite the open end 16. This enables attachment of the caster 20 to the sleeve 10, as illustrated in FIG. 2A. Alternatively, the sleeve 10 may lack a closed end 18 and instead be welded directly to the base 28 of the caster 20, as illustrated in FIG. 2B.

A caster 20 or wheel bracket is attached to the sleeve 10 as described above with reference to FIGS. 2A and 2B. The caster 20 includes a wheel 22 attached to a bracket assembly 24 with an axle 26. The base 28 of the caster 20 is fixedly mounted on the sleeve 10, but the bracket assembly 24 is rotatably mounted on the base 28 with a ball bearing race between the base 28 and the bracket assembly 24. This arrangement enables the wheel 22 to have more degrees of freedom so that the table can be easily moved in a number of directions.

Alternatively, the bracket assembly 24 and the base 28 may form a unitary structure or the wheel 22 may be mounted directly on the sleeve 51 without a caster. In either case, the wheel 22 will have a single degree of freedom. According to the latter construction, as shown in FIGS. 3A and 3B, the adapter 50 includes a sleeve 51 having depending portions 52, 54 fitted with holes 56, 58 for receiving an axle 26 on which the wheel 22 is mounted. The wheel 22 is mounted directly to the adapter 50 so that rotation is limited to a single axis. Such an adapter 50 could be used, for example, on two legs of a table as long as a conventional caster 20 is used on the other two legs in order to allow greater flexibility in turning the table. When attaching this adapter 50 to a leg 2 of a table, care must be taken that the leg 2 is not inserted so deep as to obstruct movement of the wheel 22.

Referring back to FIGS. 1–2B, the sidewall 12 of sleeve 10 has a pair of threaded holes 30, 32 formed therethrough. The threaded holes 30, 32 are preferably vertically aligned and are fitted with respective thumbscrews 34, 36 that include flat oval ends 35, 37 to facilitate turning of the respective thumbscrews 34, 36 by hand. Alternatively, the adapter 1 can be clamped using conventional clamping means known to those of ordinary skill in the art. Thus, the adapter 1 is easily attached and detached without the need for any tools.

FIGS. 2A and 2B show the leg 2 inserted in the cavity 14 of the sleeve 10. In the inserted state, the bottom 4 of the leg abuts or rests on the closed end 18 of the bottom of the cavity 14, or if no closed end 18 is provided, on the base 28 of the caster 20. If no caster 20 is provided, as shown in FIGS. 3A and 3B, then the bottom 4 of the inserted leg 2 will not rest on any surface of the adapter 1. In any event, after the leg 2 has been inserted in the sleeve 10, the screws 34, 36 are then tightened so that the ends 40, 42 thereof engage or clamp the outer surface 6 of the leg 2. As shown in FIGS. 2A and 2B, the surface 6 of the leg 2 is smooth and does not have any grooves, indentations or pin holes. Therefore, the adapter 1 is not limited to a particular piece or type of furniture, but rather can be readily applied to a wide variety of existing furniture legs. As the screws 34, 36 are tightened (turned in a clockwise direction), the leg 2 is clamped in place and the adapter 1 becomes attached thereto. The ends 40, 42 of the screws 34, 36 do not penetrate the leg 2 at all but merely rest securely against the outer surface 6 thereof so that the outer surface 6 of the leg 2 is not damaged in any way by the attachment of the adapter 1 to the leg 2. Furthermore, the adapter 1 is securely attached to the leg 2 so that the table may be stably rolled as needed or lifted without the adapter 1 falling off.

To remove the adapter 1, the screws 34, 36 are simply turned in a counterclockwise direction so that they are loosened. The ends 40, 42 of the screws 34, 36 disengage the outer surface 6 of the leg 2 and the adapter 1 can easily be slid off the end of the leg 2 or the table lifted off the adapter 1 without causing damage to the leg 2. The leg 2 of the table remains in an unaltered state and does not need to be hidden when the table is subsequently displayed. The adapter 1 then can be used on another piece of furniture or easily stored for future use.

Figure 4:
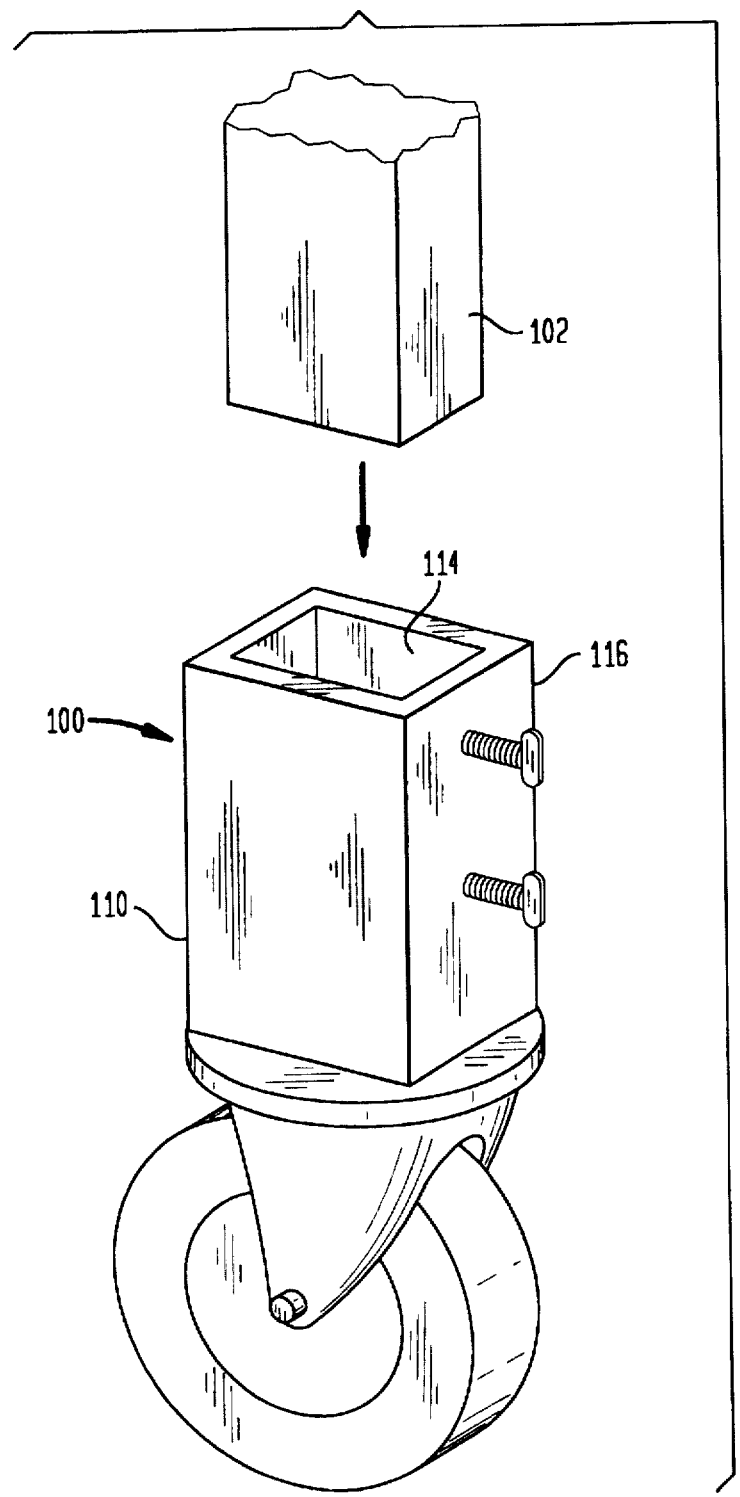
FIG. 4 is a perspective view of an apparatus according to a fourth embodiment of the present invention.

As discussed hereinabove, the shape of the cavity 14 defined by the sleeve 10 of the adapter 1 may match the shape of the leg 2 of the furniture. In addition, the size of the sleeve 10 (and the caster 20) may be varied to accommodate different table legs in the event the screws 34, 36 do not provide adequate adjustment. In FIGS. 1–3B, the shape of the sleeve 10 or 51 is circular for matching a cylindrical leg 2. In FIG. 4, an adapter 100 has a rectangular sleeve 110 defining a cavity 114 at an upper end 116 thereof for receiving a rectangular leg 102. The shape of the adapter can be any necessary shape. Further, the adapter is made of a rigid material, such as aluminum or steel, to ensure its strength and stability.

Figure 5A:
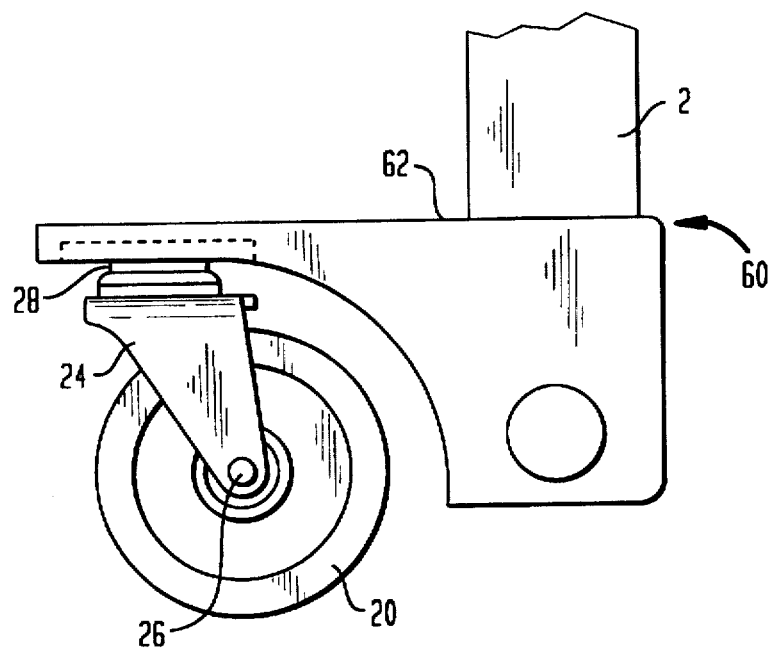
FIG. 5A is a side view of the apparatus according to a fourth embodiment of the present invention.
Figure 5B:
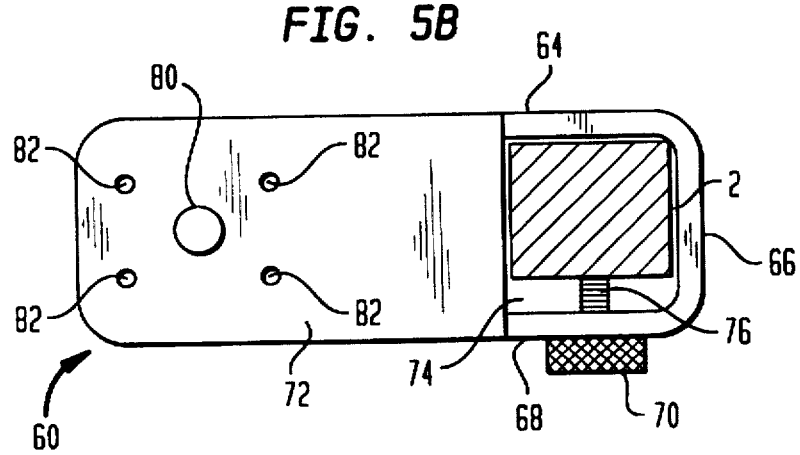
FIG. 5B is a top view of the apparatus according to the fourth embodiment of the present invention.

Turning now to the embodiment shown in FIGS. 5A and 5B, an adapter 60 consists of a caster 20 mounted on a boot 62. The boot 62 is generally L-shaped, and consists of sidewalls 64, 66, 68 and a top plate 72. The sidewalls 64, 66, 68 are connected in a U-shaped configuration so as to define a cavity 74 for receiving the leg 2 of a table (not shown). The particular shape of the cavity 74 can match the shape of the table leg 2. A clamping mechanism, such as a rotatable knob 70 connected to a threaded shaft 76, extends through a threaded hole in the sidewall 68 of the boot 62. The top plate 72 is connected to the top portions of the sidewalls 64, 68. The base 28 of the caster 20 is connected to the top plate 72. The construction and operation of the caster 20 has been described hereinabove. The point of attachment 80 of the caster 20 to the boot 62 is laterally displaced from the cavity 74 into which the table leg 2 is inserted, as shown in FIG. 5B. This arrangement enables the caster 20 to be positioned inwardly or outwardly with respect to the periphery of the table depending upon the size and weight of the table. Additionally, the point of caster attachment 80 is vertically displaced from the lower portions of the sidewalls 64, 66, 68, so that when the table leg 2 is inserted in the cavity 74, the bottom of the table leg 2 is closer to the ground than the base 28 of the caster 20. According to this arrangement, the table is able to rest close to the ground in a stable condition so that table skirts and the like appear of a proper length.

Figure 6A:
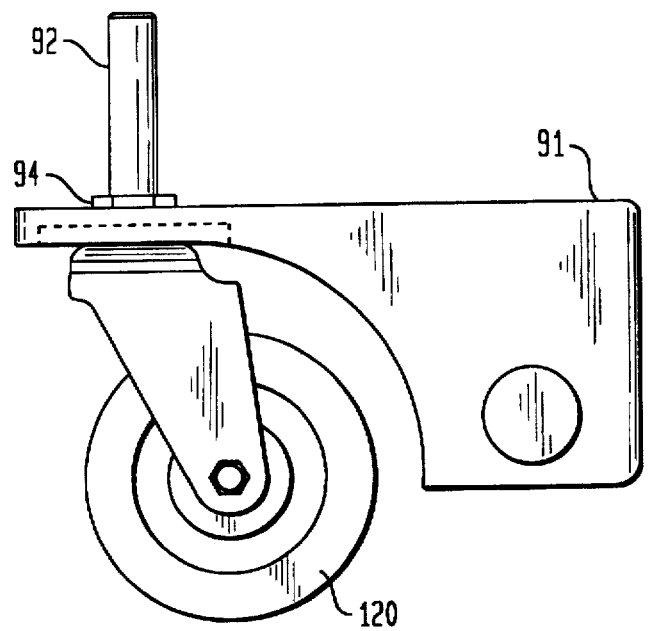
FIG. 6A is a side view of the apparatus according to a fifth embodiment of the present invention.
Figure 6B:
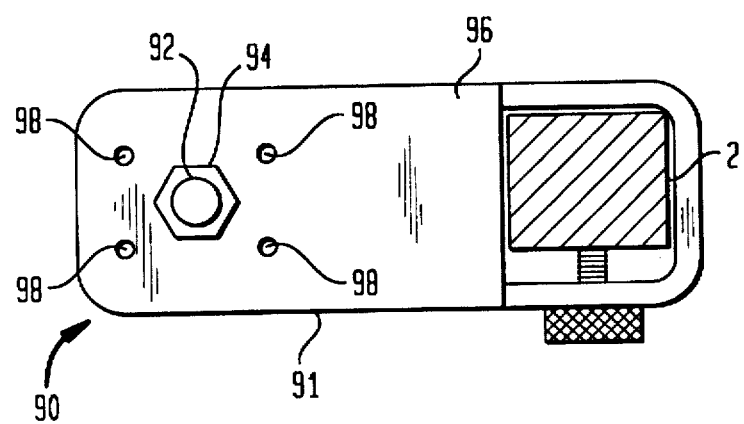
FIG. 6B is a top view of the apparatus according to the fifth embodiment of the present invention.

According to the embodiment shown in FIG. 5B, the base 28 of the caster 20 is attached to the underside of the top plate 72 with attachment means, such as rivets 82. Alternatively, according to the embodiment shown in FIGS. 6A and 6B, a heavy duty caster 120 is incorporated in the adapter 90 by means of attachment means, such as rivets 98, in conjunction with a bolt 92 inserted through a hole formed in the top plate 96 of the boot 91 which mates with a nut 94.

This additional attachment means ensures that the heavy duty caster 120 will remain stably attached to the boot 91 for safe and reliable transportation of tables.

According to the embodiment shown in FIGS. 7-9, the caster 20 can be a swingable component of the adapter 200 so that the caster 20 can be rotatingly displaced to disable same and to permit the table to remain stationary and at its original height. This is convenient, for example, when a table is only to remain stationary for a short period of time so that the removal of the adapter 200 is not practical. According to this embodiment, the boot 201 consists of sidewalls 202a, 202b, 204a, 204b, 206, 208 and a top plate 210. The top plate 210 and sidewalls 202b, 204b are formed as a first unitary structure 201a, and the sidewalls 202a, 204a, 206, 208 are formed as a second unitary structure 201b. The caster 20 is attached to the first unitary structure 201a on an underside of the top plate 210. Clamping means, such as a knob 212 connected to a threaded shaft 214, is fitted through a threaded hole formed in the sidewall 202a. The first unitary structure 201a is swingably connected to the second unitary structure 201b by a hinge 220, which is attached to the top plate 210 and to the sidewall 208. This arrangement enables the caster 20 to be swung up as shown in FIG. 9 thereby disabling the wheels so that the table becomes stationary.

The first unitary structure 201a can be biased in a disabled direction or an enabled direction by biasing means, such as a torsion spring 222, suitably mounted between the two unitary structures 201a, 201b. In order to maintain the caster 20 in a position against the bias of the torsion spring 222, locking means, such as a hook 224, is provided. The locking means can be any means for locking known to those skilled in the art, such as a self-locking mechanism, a rachet/pawl combination, a magnet, or the like. As shown in FIG. 8, for example, when the locking means 224 is utilized, the caster 20 is enabled so that the table can be transported. If the locking means 224 is not used, the biasing means 222 biases the caster 20 in a disabled position away from the ground so that the table remains stationary. This configuration enables the table to be converted from movable to stationary without having to remove the adapter 200, if so desired.

A device constructed according to the embodiments described above is sturdy and useful, for example, in the catering and party rental businesses, in which portable pieces of furniture are transported from a central location to an event location in a disassembled state, assembled upon arrival, and then moved around at the location to which they were transported. Such pieces of furniture may need to be moved after they have been dressed with a table cloth and fancy china, and after they have been covered with carefully prepared food, liquor bottles, flaming chafing dishes and other catering items. Consequently, it is extremely important that such furniture be moved smoothly and with caution. However, it is often equally important that such furniture be moved swiftly so that an affair can be set up in a short period of time, or the next course of meal can be brought in without undue delay or risk to the equipment, food, or the servers. The features of the present invention are directed to all of these concerns.

Although the various embodiments of the subject invention have been disclosed and illustrated with reference to application of the adapter to a table leg, it should be apparent to a person of ordinary skill in the art that the adapter herein disclosed can be applied to other objects and types of furniture, such as chairs and can use other methods of attachment, without departing from the scope of the present invention. Having described specific preferred embodiments of the present invention with reference to the accompanying drawings, it is to be understood that the invention is not limited to those precise embodiments, and that various changes and modifications may be effected therein by one skilled in the art without departing from the spirit or the scope of the present invention as defined in the appended claims.

What is claimed is:

1. An adapter for making an object movable, said adapter comprising:

a top plate;

a boot defining an interior space for inserting a portion of the object, the boot being connected to one end of and extending downward from the top plate; and a wheel mounted on the top plate of the boot for rotational movement with respect to the boot, wherein the interior space is the weight receiving portion which is offset from the wheel so that the weight of the object is supported in a plane vertically displaced from the top plate.

2. An adapter as claimed in claim 1, further comprising clamping means attached to the boot for clamping the inserted portion of the object, wherein the clamping means is adjustable in a first direction for engagement with the inserted portion of the object, and wherein the clamping means is adjustable in a second direction for disengagement with the inserted portion of the object.

3. An adapter as claimed in claim 1, further comprising clamping means attached to the boot for clamping the inserted portion of the object, wherein the clamping means comprises at least one screw inserted in a threaded hole formed in the sidewall of the boot.

4. An adapter as claimed in claim 1, wherein the object is a table and the inserted portion is a table leg.

5. An adapter as claimed in claim 1, wherein the interior space is cylindrical.

6. An adapter as claimed in claim 1, wherein the interior space is rectangular.

7. An adapter as claimed in claim 1, further comprising a mounting bracket mounted on the top plate of the boot for rotatably mounting the wheel.

8. An adapter as claimed in claim 7, wherein the mounting bracket is mounted to rotate with respect to the boot.

9. An adapter as claimed in claim 7, wherein the mounting bracket is mounted on the top plate with rivets.

10. An adapter as claimed in claim 7, further comprising a bolt attached to the mounting bracket, wherein the bolt extends through a hole formed in the boot and the mounting bracket is mounted on the boot by engagement of the bolt with a nut.

11. An adapter as claimed in claim 1, wherein the boot is L-shaped.

12. An adapter as claimed in claim 1, wherein the boot comprises a pair of sidewalls which define the interior space.

13. An adapter as claimed in claim 1, wherein the adapter is placed on a surface and a distance from the bottom end of the boot to the surface is less than a diameter of the wheel.

14. An adapter as claimed in claim 1, further comprising:

a hinge attached to the top plate and to the boot for pivotally connecting the top plate to the boot.

15. An adapter as claimed in claim 14, wherein the top plate pivots between a first position and a second position.

16. An adapter as claimed in claim 15, wherein the first position is a position in which the top plate is horizontal and the second position is a position in which the top plate is vertical.

17. An adapter as claimed in claim 15, further comprising biasing means for biasing the top plate toward the first position.

18. An adapter as claimed in claim 17, further comprising locking means for locking the top plate in the second position.

19. An adapter as claimed in claim 18, wherein said locking means comprises a hook.

* * * * *